(12) United States Patent
Thenault et al.

(10) Patent No.: US 7,125,927 B2
(45) Date of Patent: Oct. 24, 2006

(54) PAINT COMPOSITIONS FOR ELASTOMERS

(75) Inventors: Nathalie Thenault, Ferrieres (FR); Celine Desaindes, Nemours (FR)

(73) Assignee: Hutchinson, Paris (FR)

( * ) Notice: Subject to any disclaimer, the term of this patent is extended or adjusted under 35 U.S.C. 154(b) by 70 days.

(21) Appl. No.: 10/704,549

(22) Filed: Nov. 12, 2003

(65) Prior Publication Data

US 2004/0138374 A1    Jul. 15, 2004

(30) Foreign Application Priority Data

Nov. 20, 2002  (FR) .................................. 02 14512

(51) Int. Cl.
- *C08J 3/00* (2006.01)
- *C08K 3/20* (2006.01)
- *C08L 75/00* (2006.01)
- *B05D 3/02* (2006.01)
- *B32B 27/00* (2006.01)

(52) U.S. Cl. ...................... 524/507; 524/591; 524/839; 524/840; 524/589; 524/590; 525/123; 525/455; 525/125; 427/372.2; 427/385.5; 427/393.5; 428/423.1; 428/423.9; 277/407; 277/921

(58) Field of Classification Search ................ 524/507, 524/591, 839, 840, 589, 590; 525/123, 455, 525/125; 427/372.2, 385.5, 393.5; 428/423.1, 428/423.9; 277/407, 921
See application file for complete search history.

(56) References Cited

FOREIGN PATENT DOCUMENTS

WO    WO01/66659    * 9/2001

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Paint or varnish composition comprising, as solids:
- from 10 to 50 parts by weight of at least one polyurethane in aqueous emulsion form;
- from 10 to 30 parts by weight of at least two acrylic polymers or copolymers in aqueous emulsion form;
- from 10 to 70 parts by weight of mineral or organic fillers;
- from 5 to 20 parts by weight of processing aids; and
- from 0 to 10 parts by weight of crosslinking agent;

said composition furthermore comprising from 40 to 150 parts by weight of water, the parts being given by weight of active material in the composition.

18 Claims, No Drawings

PAINT COMPOSITIONS FOR ELASTOMERS

The subject of the present invention is novel paint or varnish compositions intended to be applied to articles made of elastomer. The subject of the invention is also the elastomer articles painted with such compositions.

Seals for automobile bodies or for opening lights in buildings are generally produced from an elastomeric material and are subjected to high stresses.

Usually, they are covered with a protective film obtained by depositing a paint in liquid form followed by drying. Such a protective film is expected to protect the elastomer article from abrasion, to improve its external appearance, especially giving it the desired tint, to reduce its friction coefficient, to withstand light and weathering and to reduce sound vibrations, especially when there is rubbing with a window pane or with a body part. Such a paint, when dried, must also be sufficiently flexible to follow the movements of the article that it protects, without forming cracks or pleats.

Finally, water-based paints or varnishes are generally preferred, because they are less polluting, and it is endeavored to produce paints or varnishes that are the most effective possible for an optimized cost.

Paints for elastomer articles are commercially available. They are generally based either on polyurethane or on silicones or on fluoropolymers.

However, none of these polymer systems is entirely satisfactory in this application.

Silicone-based paints are satisfactory from the standpoint of reducing the friction coefficient, but are only moderately satisfactory in terms of lightfastness, absorption of sound vibrations, appearance and flexibility. They are inadequate in terms of cost and abrasion resistance.

Polyurethane-based paints are satisfactory from the standpoint of abrasion resistance, but are only moderately satisfactory in terms of cost and appearance. They are inadequate in terms of absorbing sound vibrations and in reducing the friction coefficient. They are very inadequate in terms of lightfastness and weatherability.

Fluoropolymer-based paints are satisfactory from the standpoint of reducing the friction coefficient, but only moderately satisfactory in terms of lightfastness, absorption of sound vibrations, appearance and abrasion resistance. They are inadequate in terms of cost and flexibility.

The Applicant's objective was therefore to formulate a paint or varnish composition that gives satisfactory or very satisfactory results in respect of all the abovementioned evaluation criteria. Furthermore, it directs its research in the field of water-based paints so as to minimize environmental damage. An additional selection criterion was good resistance of the paint films to the washing products commonly employed for washing cars or domestic washing products.

The subject of the invention is a novel paint or varnish composition comprising, as solids:
- from 10 to 50 parts by weight of at least one polyurethane in aqueous emulsion form;
- from 10 to 30 parts by weight of at least two acrylic polymers or copolymers in aqueous emulsion form;
- from 10 to 70 parts by weight of mineral or organic fillers;
- from 5 to 20 parts by weight of processing aids; and
- from 0 to 10 parts by weight of crosslinking agent;

said composition furthermore comprising from 40 to 150 parts by weight of water, depending on the concentration of the polymers in their aqueous phase and on the desired dilution. The parts are given by weight of active material in the composition. The parts of water correspond at least to the water contained in the polyurethane emulsion and in the acrylic polymer or copolymer emulsions—water may also be incorporated into the composition in order to adjust its dilution, especially according to the mode of application.

The polyurethanes that can be used in the compositions of the invention are polymers in aqueous emulsion that result from the reaction of a polyol with a polyisocyanate, generally a diisocyanate. Among the polyols that can be used, mention may in particular be made of polyether polyols, polyester polyols, polycarbonate polyols, polycaprolactone polyols and acrylic polyols. It is preferable to use those polyurethanes of the above families of polyurethanes that are derived from aliphatic polyesters. It is preferable to choose a polyurethane that meets the following criteria:
- tensile strength greater than or equal to 25 MPa, preferably greater than or equal to 30 MPa;
- elongation at break greater than or equal to 400%, preferably greater than or equal to 450%; and
- 100% modulus less than or equal to 10 MPa, preferably less than or equal to 8 MPa; these measurements being made on dumbbell specimens in accordance with the NFT 46-002 standard on dry films.

Among the commercially available polyurethanes that can be used in the present invention, mention may in particular be made of the product sold by Baxenden Ltd under the brand name Witcobond 781.

The acrylic polymers or copolymers that can be used according to the present invention are polymers or copolymers in aqueous emulsion having a glass transition temperature between −40° C. and +5° C. The compositions of the invention comprise a blend of acrylic polymers or copolymers—at least two acrylic polymers or copolymers, one having a glass transition temperature between 0° C. and 5° C. and the other having a glass transition temperature between −40° C. and −30° C. Among the acrylic polymers or copolymers that can be used in the compositions according to the present invention, mention may in particular be made of that sold by Rhodia under the brand name Rhodopas DS 1022 and that sold by Avecia resins under the brand name Neocryl XK-90. Advantageously, a blend of Rhodopas DS 1022 and Neocryl XK-90 is used.

Among the fillers that can be used in the compositions according to the present invention, mention may in particular be made of pigments, matting agents and slip agents.

Among the processing aids that can be used in the compositions according to the present invention, mention may in particular be made of those that modify the rheology of the composition, especially thickeners.

Among the crosslinking agents that can be used in the compositions according to the present invention, it is preferable to choose a product from the family of organosilanes or from the family of blocked isocyanates.

According to a first preferred variant of the invention, the paint composition of the invention comprises:
- from 10 to 30 parts by weight of at least one polyurethane in aqueous emulsion form;
- from 10 to 30 parts by weight of at least two acrylic polymers or copolymers in aqueous emulsion form;
- from 10 to 45 parts by weight of mineral or organic fillers;
- from 5 to 15 parts by weight of processing aids;
- from 0 to 10 parts by weight of crosslinking agent and
- from 40 to 150 parts by weight of water.

Preferably, the paint composition of the invention comprises:
- from 15 to 25 parts by weight of at least one polyurethane in aqueous emulsion form;

from 15 to 25 parts by weight of at least two acrylic polymers or copolymers in aqueous emulsion form;
from 18 to 32 parts by weight of mineral or organic fillers;
from 8 to 12 parts by weight of processing aids;
from 1 to 4 parts by weight of crosslinking agent; and
from 50 to 70 parts by weight of water.

The parts are given by weight of active material in the composition.

Even more preferably, the composition of the invention comprises an approximately equivalent amount, by weight of active material, of polyurethane and of acrylic polymers or copolymers.

Advantageously, the composition of the invention comprises approximately:
20 parts by weight of at least one polyurethane in aqueous emulsion form;
20 parts by weight of at least two acrylic polymers or copolymers in aqueous emulsion form;
10 parts by weight of matting agents;
15 parts by weight of fillers;
10 parts by weight of processing aids;
2 parts by weight of crosslinking agent; and
60 parts by weight of water.

According to one other preferred variant of the present invention, the paint composition of the invention comprises:
from 25 to 45 parts by weight of at least one polyurethane in aqueous emulsion form;
from 15 to 25 parts by weight of at least two acrylic polymers or copolymers in aqueous emulsion form;
from 18 to 50 parts by weight of mineral or organic fillers;
from 10 to 18 parts by weight of processing aids;
from 1 to 4 parts by weight of crosslinking agent; and
from 50 to 70 parts by weight of water.

The parts are given by weight of active material in the composition.

Advantageously, the composition of the invention comprises approximately:
40 parts by weight of at least one polyurethane in aqueous emulsion form;
20 parts by weight of at least two acrylic polymers or copolymers in aqueous emulsion form;
15 parts by weight of matting agents;
40 parts by weight of fillers;
15 parts by weight of processing aids;
2 parts by weight of crosslinking agent; and
60 parts by weight of water.

The paint and varnish compositions according to the present invention are essentially intended to be applied to elastomer articles.

The subject of the invention is also a method of protecting an elastomer article, this method being one in which:
the starting product is an article made of a vulcanized elastomer;
the elastomer article is treated so as to allow adhesion to its surface;
a paint or varnish composition as described above is applied to all or part of the elastomer article; and
the article coated with a paint or varnish film is dried.

The starting product may be made of any elastomer material: the elastomer materials that can be used in the method according to the present invention are natural and synthetic rubbers and thermoplastic elastomers. Of course, it is possible to use a blend of several elastomers.

Among synthetic rubbers, mention may be made of styrene-butadiene rubbers (SBR), isoprene rubbers (IR), butadiene rubbers (BR), ethylene-propylene rubbers (EPR), nitrile rubbers (NBR), butyl rubbers (IIR), ethylene-propylene-diene terpolymers (EPDM), chloroprenes (CR), chlorosulfonated polyethylenes (CSM), fluorocarbons (FPM), polyurethanes (PU), nitrile/PVC rubbers (NBR/PVC), neoprenes (CR), epichlorohydrin rubbers (CO), epichlorohydrin copolymers (ECO), silicones (VMQ), fluorosilicones (FVMQ), polyethyl acrylates (ACM) and polyisobutylenes (PIB).

Among thermoplastic elastomers, mention may be made of two large families, namely ionomers and block copolymers. Ionomers are copolymers in which a small portion of the constituent units are ionic groups. Block copolymers contain separate comonomers in long sections of the main chain. Among thermoplastic elastomer block copolymers, mention may in particular be made of styrene-butadiene-styrene copolymers (SBS), styrene-isoprene-styrene copolymers (SIS) and styrene-ethylene/butylene-styrene copolymers (SEBS). Thermoplastic elastomers may be made from an olefin monomer such as ethylene or propylene, using the polymerization catalyzed by a metallocene, as described in document WO 97/44390. In particular, such thermoplastic elastomers include polyethylenes, polypropylenes and ethylene-propylene copolymers, preferably grafted with acrylic acid, maleic anhydride or glycidyl methacrylate, the polymerization being catalyzed by a metallocene, preferably by a polyoctene.

The elastomers preferably used in the present invention are those chosen from natural rubber, nitrile rubbers (NBR), ethylene-propylene-diene terpolymers (EPDM), chloroprenes (CR) and polyisobutylenes (PIB). Advantageously, an EPDM is used.

The treatments intended to promote the adhesion to the surface of an elastomer article are well known to those skilled in the art; in particular, mention may be made of the following: corona treatment; application of an adhesion primer, such as for example, the product sold by Whitford under the brand name Xylan 4016; an ultraviolet radiation treatment; a plasma treatment.

The varnish or paint is applied by any means known to those skilled in the art, namely by brushing, by dipping, by an air spray gun or an electrostatic spray gun. When the paint is applied using an air gun, it is deposited on the hot elastomer article at a temperature between 100° C. and 130° C. When the paint is applied using an electrostatic spray gun, it is deposited on the elastomer article at room temperature. Preferably, the paint is applied using an air spray gun or an electrostatic spray gun. Usually, the paint is deposited so as to obtain a film with a thickness ranging from 5 to 25 μm, advantageously from 10 to 20 μm The paint is preferably dried at a temperature of 100° C. or higher.

By virtue of the method according to the present invention, it is possible in particular to obtain an elastomer article having a protective film that is inexpensive and flexible while protecting against abrasion and being light-resistant, weather-resistant and resistant to washing products, that improves its external appearance, giving it in particular the desired tint, that reduces its friction coefficient and that attenuates sound vibrations, especially owing to rubbing with a window pane or with a body part. Advantageously, the articles of the invention are provided with properties that are superior to the part made of elastomer material from which they are obtained, as regards at least one of the following criteria: protection from abrasion, light and weather resistance, resistance to washing products, low friction coefficient and low sound vibrations.

The flexibility of the films obtained may be quantified: in general, films having the following properties are obtained:

elongation at break greater than or equal to 100%, preferably greater than or equal to 150% and even more preferably greater than or equal to 180% and tensile strength greater than or equal to 3 MPa and preferably greater than or equal to 4 MPa (these measurements are made on dumbbell specimens according to the NFT 46-002 standard on dry films). The subject of the invention is also the use of a varnish or paint composition as defined above to obtain a film provided with these characteristics.

The subject of the invention is also an elastomer article obtained by the method of the invention. Such an article is formed from a part made of an elastomer material and from a protective film obtained by depositing, on all or part of the elastomer part, of a paint or varnish composition described above and by drying said composition.

The articles prepared in accordance with the method of the invention can be used in particular as sealing parts, in particular as sealing strip in the automobile industry, or as antivibration parts. They may also be used for sealing opening lights in buildings.

EXAMPLES

Equipment:

SEPAP is an accelerated-photoaging chamber for reproducing natural aging under accelerated conditions.

Example 1

The following paint composition was prepared, in which the quantities are expressed in parts by weight of constituent, said constituents being identified by their brand name:

| Constituent | Amount |
| --- | --- |
| Witcobond 781 | 45 |
| Neocryl XK-90 | 20 |
| Rhodopas DS 1022 | 30 |
| Byk 348 | 0.5 |
| Byk 024 | 0.3 |
| Ceraflour 920 | 8 |
| DC-84 | 2 |
| Borchigel LW-44 | 2 |
| Spheriglass 5000CP03 | 10 |
| NMP | 4 |
| Pigment base | 3 |

The paint composition of the invention was then applied to an elastomer (EPDM) seal and then dried. The film obtained (thickness 15 µm) was characterized by:
- excellent lightfastness (exposure for 300 h to ultraviolet in the SEPAP with hydrolysis for 2 h at 60° C.: only a slight bleaching was observed);
- very good aging resistance (residual elongation at break greater than 90% after four days at 90° C.);
- good chemical resistance: little change after being in contact with products such as soapy water and windscreen washer;
- great flexibility: elongation at break equal to 212% and tensile strength equal to 5.6 MPa (these measurements were made on dumbbell specimens according to the NFT 46-002 standard on dry films); and
- good abrasion resistance: wear by a textile cloth or by a piano wire against the painted seal.

Example 2

The following paint composition was prepared, in which the quantities are expressed in parts by weight of constituent, said constituents being identified by their brand name:

| Constituent | Amount |
| --- | --- |
| Witcobond 781 | 90 |
| Neocryl XK-90 | 20 |
| Rhodopas DS 1022 | 30 |
| Byk 348 | 2 |
| Byk 024 | 1 |
| Ceraflour 920 | 10 |
| DC-84 | 2 |
| Borchigel LW-44 | 1 |
| Spheriglass 5000CP03 | 15 |
| NMP | 4 |
| Pigment base | 3 |
| Fluoro AQ50 | 10 |

The paint composition of the invention was then applied to an elastomer (EPDM) seal and then dried. The film obtained (thickness 15 µm) was characterized by:
- excellent lightfastness (exposure for 300 h to ultraviolet in the SEPAP with hydrolysis for 2 h at 60° C.: only a slight bleaching was observed);
- very good aging resistance (residual elongation at break greater than 90% after four days at 90° C.);
- good chemical resistance: little change after being in contact with products such as soapy water and windscreen washer;
- great flexibility: elongation at break equal to 212% and tensile strength equal to 5.6 MPa (these measurements were made on dumbbell specimens according to the NFT 46-002 standard on dry films);
- very good abrasion resistance (wear by a window pane edge against the painted seal); and
- reduction or elimination of the sound vibrations arising due to the friction of body parts.

The invention claimed is:

1. A paint or varnish composition comprising;
   a) from 10 to 50 parts by weight of at least one polyurethane in aqueous emulsion form;
   b) from 10 to 30 parts by weight of at least two acrylic polymers or copolymers in aqueous emulsion form;
   c) from 10 to 70 parts by weight of mineral or organic fillers;
   d) from 5 to 20 parts by weight of processing aids; and
   e) from 0 to 10 parts by weight of crosslinking agent;
   f) from 40 to 150 parts by weight of water;
   wherein said parts are base on the weight of active material in the composition;
   wherein the at least two acrylic polymers or copolymers are chosen in such a way that one has a glass transition temperature between 0° and +5° C. and the other has a glass transition temperature between −40° C. and −30° C.

2. The composition as claimed in claim 1, wherein the polyurethane is obtained by reacting an aliphatic polyester polyol and a polyisocyanate.

3. The composition as claimed in claim 1, wherein the polyurethane has:
   a tensile strength greater than or equal to 25 MPa;
   an elongation at break greater than or equal to 400%; and
   a 100% modulus less than or equal to 10 MPa.

4. The composition as claimed in claim 1, comprising:
a) from 10 to 30 parts by weight of at least one polyurethane in aqueous emulsion form;
b) from 10 to 30 parts by weight of at least two acrylic polymers or copolymers in aqueous emulsion form;
c) from 10 to 45 parts by weight of at least one mineral or organic filler;
d) from 5 to 15 parts by weight of at least one processing aid;
e) from 0 to 10 parts by weight of at least one crosslinking agent;
f) from 40 to 150 parts by weight of water;
wherein said parts are based on the weight of active material in the composition.

5. The composition as claimed in claim 1, comprising:
a) from 15 to 25 parts by weight of at least one polyurethane in aqueous emulsion form;
b) from 15 to 25 parts by weight of at least two acrylic polymers or copolymers in aqueous emulsion form;
c) from 18 to 32 parts by weight of at least one mineral or organic filler;
d) from 8 to 12 parts by weight of at least one processing aid;
e) from 1 to 4 parts by weight of at least one crosslinking agent; and
f) from 50 to 70 parts by weight of water.

6. The composition as claimed in claim 1, which comprises an
approximately equivalent amount, by weight based on the sum of the weight of components
a) and b), of polyurethane and of acrylic polymers or copolymers.

7. The composition as claimed in claim 1, comprising:
a) from 25 to 45 parts by weight of at least one polyurethane in aqueous emulsion form;
b) from 15 to 25 parts by weight of at least two acrylic polymers or copolymers in aqueous emulsion form;
c) from 18 to 50 parts by weight of at least one mineral or organic filler;
d) from 10 to 18 parts by weight of at least one processing aid;
e) from 1 to 4 parts by weight of at least one crosslinking agent; and
f) from 50 to 70 parts by weight of water.

8. A method of protecting an elastomer article, comprising:
treating an elastomer article, comprising vulcanized elastomer, so as to allow adhesion to a surface of said elastomer article;
applying a paint or varnish composition as described in claim 1 to all or part of said elastomer article, to obtain a coated elastomer article; and
drying said coated elastomer article.

9. The method as claimed in claim 8, wherein the elastomer is selected from the group consisting of natural rubber, nitrile rubbers, ethylene-propylene-diene terpolymers, chloroprenes, polyisobutylenes and mixtures thereof.

10. The method as claimed in claim 8, wherein the varnish or paint composition is applied by an air spray gun or an electrostatic spray gun.

11. The method as claimed in claim 8, wherein the paint is dried at a temperature of 100° C. or higher.

12. A film, comprising:
the composition as claimed in claim 1;
wherein said film has an elongation at break greater than or equal to 100% and tensile strength greater than or equal to 3 MPa.

13. An article, comprising:
a part comprising an elastomer material, and
a protective film obtained by depositing, on all or part of said part comprising said
elastomer material, a paint or varnish composition as claimed in claim 1; and
by drying said paint or varnish composition.

14. The article as claimed in claim 13, having at least one property that are superior to the properties of the part comprising said elastomer material,
said at least one property being selected from the group consisting of protection from abrasion, light resistance, weather resistance, resistance to washing products, low friction coefficient, low sound vibrations and combinations thereof.

15. The article as claimed in claim 13, which is a sealing strip or an antivibration part.

16. The composition as claimed in claim 1, wherein the polyurethane has a tensile strength greater than or equal to 0.30 MPa.

17. The composition as claimed in claim 1, wherein the polyurethane has an elongation at break greater than or equal to 450%.

18. The composition as claimed in claim 1, wherein the polyurethane has a 100% modulus less than or equal to 8 MPa.

* * * * *